US008654361B2

(12) United States Patent
Yoshie

(10) Patent No.: US 8,654,361 B2
(45) Date of Patent: Feb. 18, 2014

(54) DETECTION DEVICE, PRINTER, AND CONTROL METHOD THAT SELECTIVELY INTERRUPTS THE POWER SUPPLY

(75) Inventor: Shinichi Yoshie, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 13/156,406

(22) Filed: Jun. 9, 2011

(65) Prior Publication Data

US 2011/0310419 A1 Dec. 22, 2011

(30) Foreign Application Priority Data

Jun. 18, 2010 (JP) ................................ 2010-139137

(51) Int. Cl.
*G06F 3/12* (2006.01)

(52) U.S. Cl.
USPC .......................... 358/1.13; 358/474; 358/498

(58) Field of Classification Search
USPC ....................................... 358/1.13, 474–498
See application file for complete search history.

(56) References Cited

U.S. PATENT DOCUMENTS 7,292,672 B2 11/2007 Isono
7,894,085 B2 2/2011 Maeda
2007/0146775 A1* 6/2007 Maeda ........................ 358/1.15
2007/0146818 A1* 6/2007 Horiguchi .................... 358/474
2008/0112021 A1* 5/2008 Katsuyama .................. 358/498

FOREIGN PATENT DOCUMENTS

| | | |
|---|---|---|
| CN | 1770329 | 5/2006 |
| CN | 1946131 | 4/2007 |
| JP | 09-249339 | 9/1997 |
| JP | 09-315672 | 12/1997 |
| JP | 10-035951 | 2/1998 |

* cited by examiner

*Primary Examiner* — Qian Yang

(57) ABSTRACT

The time the control device of a small information device spends in an energy conservation mode is maximized to achieve low power consumption while stabilizing measurements. A measurement device that intermittently drives an LED to emit a detection beam and intermittently receives and measures the detection beam by means of a photodetector has a CPU that changes its own operating mode to a sleep mode in which the LED drive state is sustained for the time until the LED drive state stabilizes after driving the LED starts.

13 Claims, 5 Drawing Sheets

DETECTION DEVICE, PRINTER, AND CONTROL METHOD THAT SELECTIVELY INTERRUPTS THE POWER SUPPLY

This application claims priority under 35 U.S.C. §119 to Japanese Application No. 2010-139137, filed on Jun. 18, 2010, which is hereby incorporated by reference in its entirety.

BACKGROUND

1. Technical Field

The present invention relates to a detection device, a printer, and a control method for a detection device, and relates more particularly to technology for reducing power consumption.

2. Related Art

Some printers and other small information devices operate using DC power supplied from an externally connected power supply device. Demand has also increased for devices that suppress supplying DC power to relatively high power consumption components, such as internal circuits including the CPU (microprocessor), during idle time in order to reduce power consumption. This idle time (waiting time) is a period when the power switch of the information device is on but the information device is not used for an extended period of time and the primary function of the information device is not utilized.

Some countries also have regulations requiring the use of environmental design (such as "Design for Environment" (DfE) or "EcoDesign") principles in energy-using products. Some countries also require suppression of power consumption to a specified level or below when in the off -mode (an operating state in which the information device is connected to a commercial power supply but no information device functions are being used).

System-on-chip (SoC) devices that integrate a group of functions required for a particular application on a single semiconductor chip are also known from the literature.

However, because SoC devices consume a lot of power even when idle, energy efficiency is achieved by entering a sleep mode or other energy conservation mode.

Depending upon where the printer is installed, ambient light such as sunlight entering the printer from the paper insertion opening or the paper exit maybe incident to the paper detector used in conventional printers. This ambient light can be detected by the photodetector of the paper detector and result in detection errors.

This can result in falsely determining that paper is present even though there is no recording paper, or falsely determining that there is no paper even though recording paper is present.

To solve this problem, Japanese Unexamined Patent Appl. Pub. JP-A-2002-068529 teaches technology for cancelling the effect of ambient light so that recording paper can be detected without being affected by ambient light even under conditions prone to detection errors due to such ambient light.

However, reducing power consumption during idle time is essential to promoting low power consumption in small information devices.

As a result, Japanese Unexamined Patent Appl. Pub. JP-A-2010-036528 teaches technology that intermittently turns a sensor on and off to suppress current consumption by the sensor.

In addition, when an SoC is used as the controller, devices that change the operating mode to a sleep mode to minimize the functionality of the microprocessor that functions as the main control unit inside the SoC when a non-operating idle state that is entered to reduce power consumption continues for a specified time are also known.

However, when the controller enters the sleep mode, the power supply for driving the user interface and sensors for monitoring the operating state cannot be stopped.

When a SoC according to the related art uses a photosensor for status monitoring, the detection timing cannot be managed if the controller is set to the sleep mode. The sleep mode can therefore not be entered when the photosensor must be driven intermittently and detection performed. The problem with a controller that can enter a sleep mode is that the sleep mode cannot be enabled, the controller must always remain in the drive state, and energy cannot be conserved. In addition, the controller does not need to monitor sensor output until the sensor stabilizes, but the sleep mode is not enabled during this time.

SUMMARY

A detection device, a printer, and a control method for a detection device according to the invention can set the controller of a compact information device to a sleep mode to achieve low power consumption while enabling intermittent driving and detection.

A first aspect of the invention is a detection device including: a light-emitting device that emits a detection beam; a photodetection device that receives the detection beam; a control unit that outputs a control signal controlling power supply to the light-emitting device; and a holding unit that holds the control signal. The control unit outputs the control signal at a specific interval, supplies and interrupts the supply of power to the light-emitting device, can switch between a normal mode and a sleep mode in which at least some function is disabled, and synchronizes the timing of transitions between the normal mode and the sleep mode with the timing of transitions between supplying and not supplying power to the light-emitting device; and the holding unit holds the control signal at least while the control unit is in the sleep mode.

A detection device according to this aspect of the invention can set the control unit to a sleep mode and reduce power consumption while supplying or not supplying power to a light-emitting device. More particularly, supplying power and interrupting the power supply to the light-emitting device can continue even in the sleep mode.

In a detection device according to another aspect of the invention, the control unit acquires a detection signal from the photodetection device when power is supplied to the light-emitting device, acquires a detection signal from the photodetection device when power is not supplied to the light-emitting device, and detects the detection beam based on both detection signals.

When the photodetector is also subject to ambient light and background noise, this aspect of the invention enables removing the noise signal of the photodetector detected when the power was off from the detection signal containing the noise signal of the photodetector when power is supplied to the light-emitting device, and enables more accurate detection.

In a detection device according to another aspect of the invention, the control unit outputs a control signal that interrupts the power supply if power was supplied to the light-emitting device, and supplies power if power was not supplied to the light-emitting device, before changing from the normal mode to the sleep mode.

This aspect of the invention enables repeatedly alternating between supplying and not supplying power to the light-emitting device each time the control unit goes from the normal mode to the sleep mode, and can transition to a sleep mode that is effective for energy conservation.

Furthermore, because the control device in this aspect of the invention sets its own operating mode to the sleep mode while holding the same LED drive state until the LED drive state stabilizes after driving the LED starts, the LED can sustain the same drive state while reducing power consumption and preparing for the next measurement.

In a detection device according to another aspect of the invention, the interval for changing between the normal mode and the sleep mode is longer than the time required for the detection signal from the photodetection device to stabilize after power supply to the light-emitting device starts.

This aspect of the invention enables both more reliable detection and energy conservation because during the transient state until the detection signal of the photodetector stabilizes after the normal mode is enabled and the light-emitting device receives power and starts emitting, the detection device first sets and waits in the sleep mode and then resumes the normal mode and detects the detection signal after detection signal output stabilizes.

A detection device according to another aspect of the invention further preferably also has a timer that measures at least the sleep time, and the control unit changes from the sleep mode to the normal mode based on time kept by the timer.

In this aspect of the invention the control unit can be easily woken from the sleep mode by a timer interrupt and resume the normal mode.

Another aspect of the invention is a printer having a detection device and a print unit that prints based on detection results from the detection device. The detection device has a light-emitting device and a photodetection device disposed to a media transportation path that conveys a print medium, a control unit that outputs a control signal controlling power supply to the light-emitting device, and a holding unit that holds the control signal.

Even in a printer that has a photodetector disposed at the paper insertion opening or discharge exit and is susceptible to the effects of ambient light and background noise, this aspect of the invention enables setting the control unit to the sleep mode and reducing power consumption while removing the effect of ambient light and background noise and alternately supplying and not supplying power to the light-emitting device.

Another aspect of the invention is a method of controlling a detection device having a light-emitting device that emits a detection beam, a photodetection device that receives the detection beam, a control unit that outputs a control signal controlling power supply to the light-emitting device, and a holding unit that holds the control signal, the control method including steps of: the control unit switching power supply to the light-emitting device on and off synchronized to the timing at which the control unit changes between a normal mode and a sleep mode in which at least some function is disabled; and the holding unit holds the control signal at least while the control unit is in the sleep mode.

This aspect of the invention enables setting the control unit to the sleep mode and reducing power consumption while alternately supplying and not supplying power to the light-emitting device. More particularly, supplying and not supplying power to the light-emitting device can continue even in the sleep mode.

Because the control device in this aspect of the invention sets its own operating mode to the sleep mode while holding the same LED drive state until the LED drive state stabilizes after driving the LED starts, the LED can sustain the same drive state while reducing power consumption and preparing for the next measurement.

Effect of the invention

While turning the power supply to a light-emitting device on and off, the detection device according to the invention can set the control unit to the sleep mode to reduce power consumption, and can continue supplying power and interrupting the power supply to the light-emitting device while in the sleep mode.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
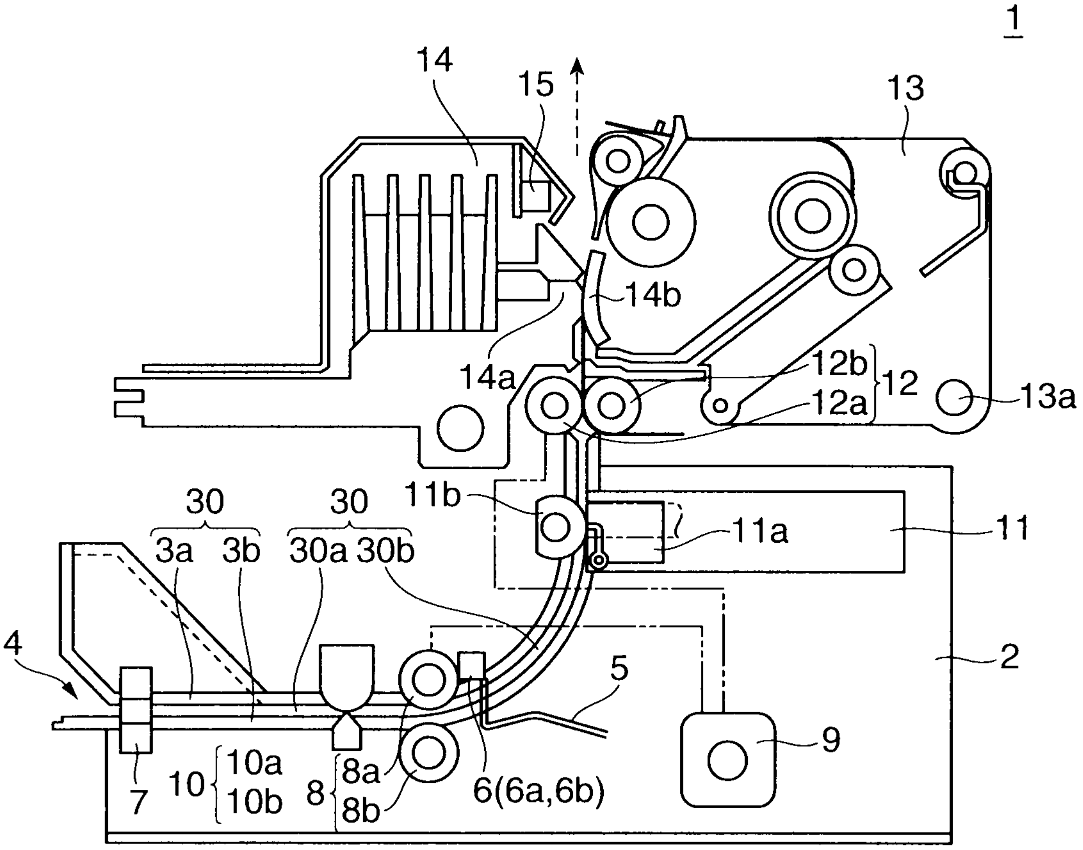
FIG. 1 is a side view schematically showing the configuration of a printer according to a preferred embodiment of the invention.

FIG. 1 is a side view schematically showing the configuration of a printer according to this embodiment of the invention.

As shown in FIG. 1, the printer 1 has a main frame 2, and a paper guide 3 including a pair of top and bottom paper guide members 3*a* and 3*b* disposed to the main frame 2 with a specific gap between the guide members. The paper guide 3 extends substantially horizontally from a position at the front side of the printer 1 (the left as seen in FIG. 1) to an interior position from which it curves and extends to the top of the printer 1. A paper path (media transportation path) 30 including a flat first paper path 30*a* and a curved second paper path 30*b* is thus formed by the paper guide 3. Recording paper (print media) inserted to the printer 1 is conveyed bidirectionally along the paper path 30. Note that the first paper path 30*a* side is the upstream side in the paper feed direction, and the second paper path 30*b* side is the downstream side in the paper feed direction.

A paper insertion opening 4 is formed on the upstream side of the paper guide 3. A paper stop 5 for momentarily contacting the leading end of the recording paper is pivotably disposed midway through the paper guide 3.

A leading end paper sensor (paper sensor) 6 and a trailing end paper sensor 7 are disposed to the first paper path 30*a* portion of the paper guide 3.

The leading end paper sensor 6 is a reflective photosensor having an LED 6*a* and a photodetector (photoreceptor) 6*b* disposed substantially on the same plane. The leading end paper sensor 6 is located near the paper stop 5 on the upstream side of the paper stop 5. As a result, the leading end paper sensor 6 detects the leading end part of the recording paper when the paper is against the paper stop 5. In this embodiment of the invention the leading end paper sensor 6 is one part of the paper detection device (detection device) 20 described below.

The trailing end paper sensor 7 is an interrupt-type photosensor having an LED and a photodetector (photoreceptor) disposed opposite each other near the paper insertion opening 4. As a result, the trailing end paper sensor 7 detects the trailing end of the recording paper when the leading end of the paper is against the paper stop 5. The printer 1 can thus detect whether or not recording paper was inserted to the paper insertion opening 4 based on output from the leading end paper sensor 6 and the trailing end paper sensor 7.

First paper feed rollers 8 are disposed on the upstream side of the paper stop 5 in the paper feed direction. The first paper feed rollers 8 include a drive roller 8*a* and a follower roller 8*b* pair. The drive roller 8*a* is disposed so that power from a drive motor 9 is transmitted thereto by means of a gear train not shown.

The recording paper used in this printer 1 includes checks that have an MICR (magnetic ink character recognition) line printed thereon. A magnetic reader 10 for reading the MICR line of each check is disposed at a position upstream in the paper feed direction from the first paper feed roller 8. The magnetic reader 10 includes a reading head 10*a* and a head pressure member 10*b*. A magnetizing member (not shown in the figure) for magnetizing the MICR characters is also disposed at a position upstream in the paper feed direction from the magnetic reader 10.

A reverse print mechanism (print unit) 11 for printing on the back of a check is disposed at a position along the second paper path 30*b* of the paper guide 3. This reverse print mechanism 11 includes a dot impact printhead 11*a* and a platen 11*b*.

Second paper feed rollers 12 are disposed downstream from the reverse print mechanism 11 in the paper feed direction. The second paper feed rollers 12 include a drive roller 12*a* and a follower roller 12*b* pair. The drive roller 12*a* is disposed to rotate in unison with the drive roller 8*a* of the first paper feed rollers 8 when power from the foregoing drive motor 9 is transferred thereto through the gear train.

A paper discharge mechanism 13 and a front print mechanism 14 are also disposed to the main frame 2. The paper discharge mechanism 13 is a mechanism that forms a paper path extending the second paper path 30*b* and another paper path separate therefrom, can discharge the recording paper in two directions, and can pivot open to the back of the main frame 2 on a support shaft 13*a*.

The front print mechanism 14 (print unit) includes a dot impact printhead 14*a* and a platen 14*b*. The printhead 14*a* is disposed on the top paper guide member 3*a* side of the second paper path 30*b*. The platen 14*b* is disposed in the paper discharge mechanism 13 opposite the printhead 14*a*.

A paper discharge sensor 15 is disposed near the printhead 14*a* on the downstream side in the paper feed direction. Similarly to the leading end paper sensor 6, the paper discharge sensor 15 is a reflective photosensor that detects if the recording paper was discharged.

Figure 2:
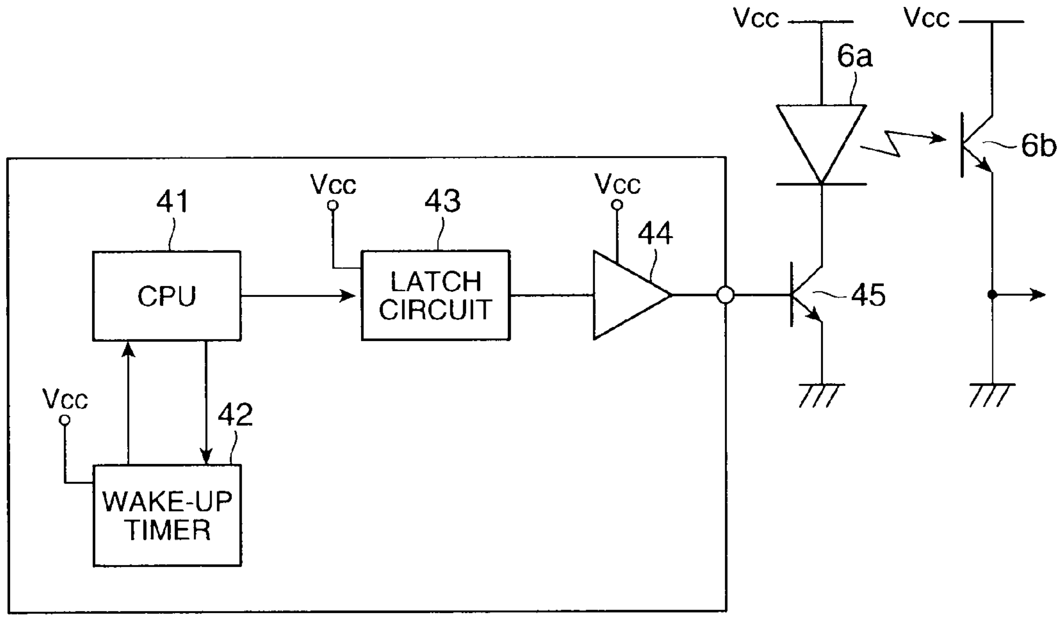
FIG. 2 is a block diagram of the control system of a paper detector according to a preferred embodiment of the invention.

FIG. 2 is a block diagram of the control system of the paper detection device according to this embodiment of the invention.

The control system of the paper detection device includes a CPU (control unit) 41 and a wake-up timer 42. The CPU 41 outputs an LED drive signal (control signal) that controls whether the LED 6*a* is driven (power is supplied) or idle (power is not supplied). When the operating mode of the CPU 41 is set to the sleep mode, the wake-up timer 42 causes the CPU 41 to wake up and run the leading end paper sensor 6 drive process and measurement (detection) operations.

The control system of the paper detection device also includes a latch circuit (holding unit) 43 and an amplifier 44. The latch circuit 43 sustains output of the LED drive signal until the power supply (Vcc) is interrupted or the latch is released by the CPU 41, including the period until operation of the leading end paper sensor 6 stabilizes when the CPU 41 is in the sleep mode. The amplifier 44 amplifies the output of the latch circuit 43 and outputs to the base of switching transistor 45, which controls the drive (power supply) or idle (power supply interrupted) state of the LED 6*a*.

In the normal mode, the CPU 41 can execute all functions, can execute processes based on information stored in internal or connected memory, and can input and output specific signals at specific times from the I/O ports.

In the sleep mode, the CPU 41 enables only a wakeup function that receives interrupts from the wake-up timer 42, and disables all other functions. Power can therefore be conserved. The wake-up timer 42 can alternatively be embedded in the CPU 41. Output from the CPU 41 to the latch circuit 43 is also disabled in the sleep mode, but because the output state before the sleep mode was entered is held in the latch circuit 43, output to the amplifier 44 continues and the LED 6*a* is held in the same drive or idle state.

Figure 3:
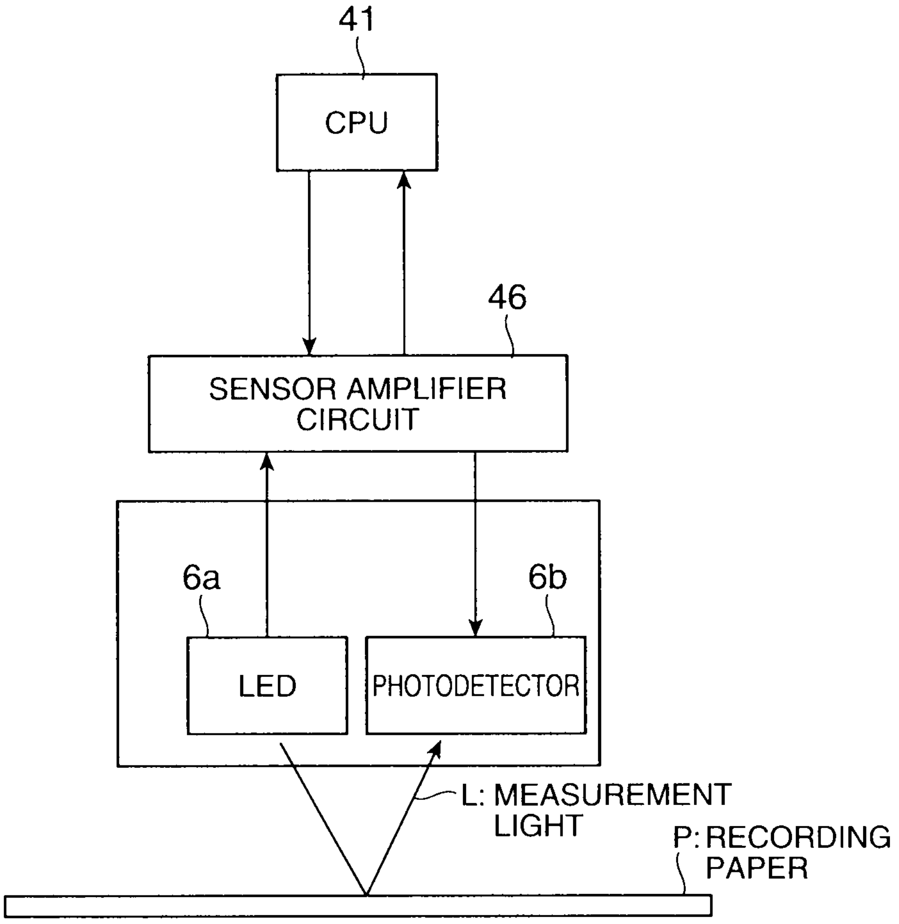
FIG. 3 schematically describes the configuration of peripheral circuits of the leading end paper sensor 6.

FIG. 3 describes the configuration of peripheral circuits of the leading end paper sensor 6.

The leading end paper sensor 6 includes a sensor amplifier circuit 46. The sensor amplifier circuit 46 supplies drive power to the LED 6*a* and photodetector 6*b* as controlled by the CPU 41. While controlling driving the LED 6*a* of the leading end paper sensor 6 based on control data input from a digital output port of the CPU 41, the sensor amplifier circuit 46 also amplifies and A/D converts the output signal of the photodetector 6*b*, and outputs the result as a detection signal (measurement data) to a digital input port of the CPU 41.

The leading end paper sensor 6 detects if recording paper P is present, and the LED 6*a* emits light (detection beam) toward the recording paper P. When recording paper P is present, the light is reflected by the recording paper P, and the photodetector 6*b* detects the light incident thereto. When recording paper P is not present, the light is not reflected by the recording paper P and is not incident to the photodetector 6*b*, and is therefore not detected. In other words, the LED 6*a* emits light toward the recording paper P, that recording paper P is present is determined as a result of the photodetector 6*b* detecting the reflected light, and that recording paper P is not present is determined as a result of the light not being detected.

When the photodetector 6*b* is located near the insertion opening or discharge exit of the recording paper P, ambient light other than the detection beam can enter, noise may be included in the detection data from the photodetector 6*b*, and detection errors can result. As a result, the CPU 41 interrupts the power supply to the LED 6*a* (power off), stores the detection data obtained from the photodetector 6*b* while the LED 6*a* is off as noise data, and removes the stored noise data from or compares the noise data with the measurement data obtained when drive power is supplied to the LED 6*a* (power on). The presence of recording paper P can therefore be detected more accurately.

Because ambient light may be reflected or blocked and therefore change when the recording paper P or the operator's hand, for example, is near the recording paper P insertion opening or discharge exit, the measurement data is preferably acquired plural times.

Operation of this embodiment of the invention is described next.

Figure 4:
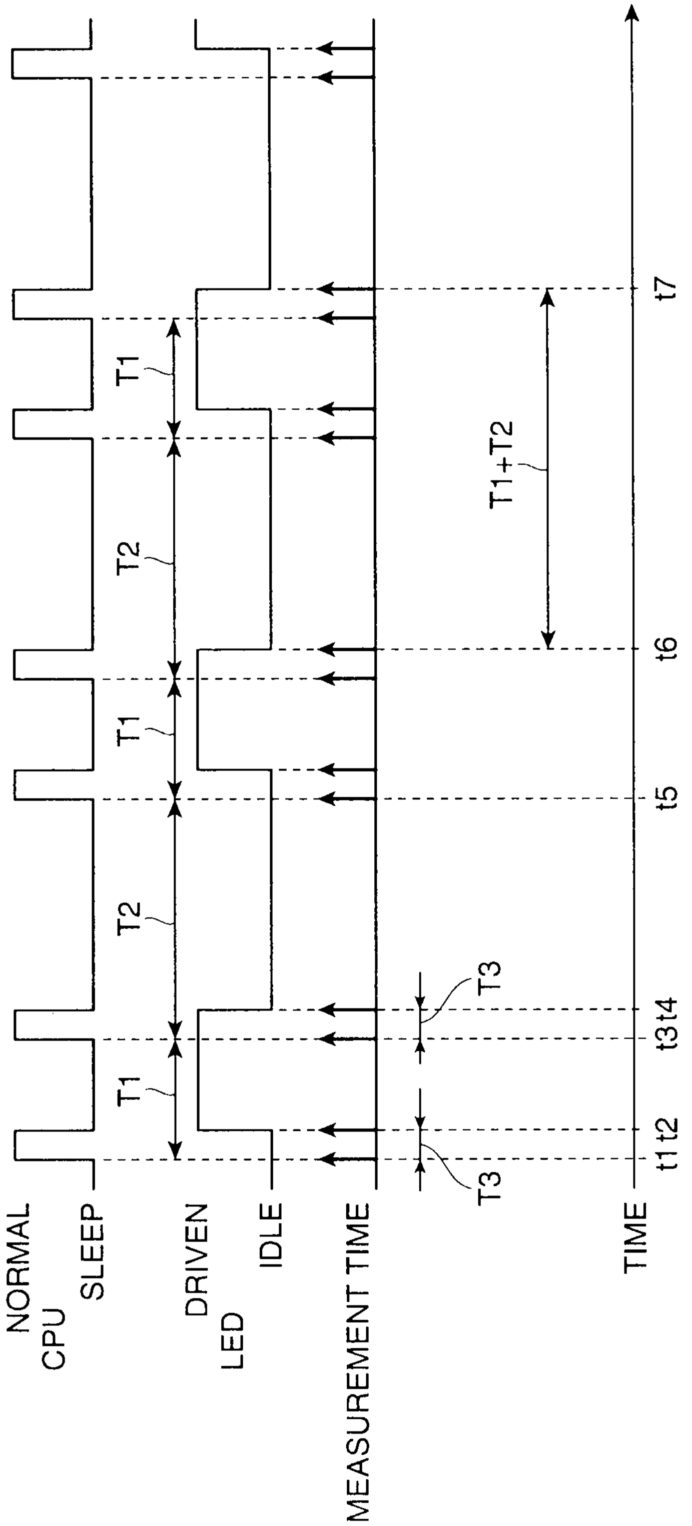
FIG. 4 is a timing chart of the operation of a preferred embodiment of the invention.
Figure 5:
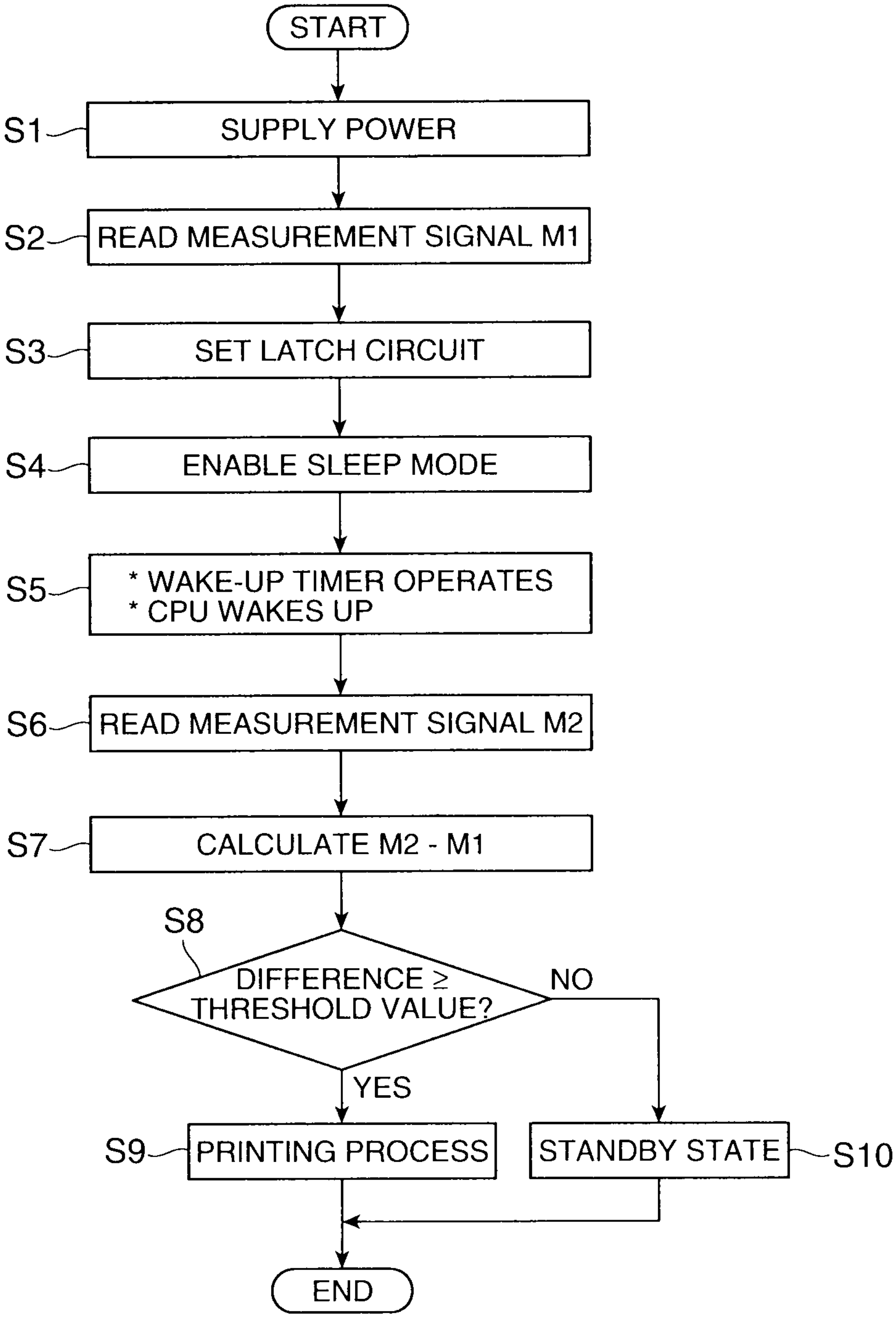
FIG. 5 is a flow chart of a process executed by a preferred embodiment of the invention.

FIG. 4 is a timing chart of the operation, and FIG. 5 is a flow chart of the process executed in this embodiment of the invention.

When the printer 1 power is turned on, the CPU 41 enters the normal mode, power is supplied to the sensor amplifier circuit 46, and drive power is supplied to the LED 6a and photodetector 6b (step S1). The CPU 41 is then assumed to remain idle, drive power to the LED 6a to be interrupted (turned off), and a sleep mode entered.

When at time t1 the CPU 41 goes from the sleep mode to the normal operating state (normal mode) due to a wakeup signal from the wake-up timer 42, the CPU 41 holds the LED 6a of the leading end paper sensor 6 in the non-driven (idle) state (power off) and reads the measurement data, which is the measurement signal M1 from the photodetector 6b, until time t2 (step S2).

When the LED 6a is in the non-driven state, the signal level of the measurement signal M1 from the photodetector 6b is equivalent to the light level of only the ambient light incident to the photodetector 6b. The CPU 41 reads measurement data (measurement signal M1) representing the background noise of the photodetector 6b. The length of the signal reading period T3 is 300 ⌈ sec in this embodiment of the invention. Signal M1 is read at least once in this signal reading period, but in order to handle different levels of ambient light, plural measurements could be taken, effective signals could be extracted from the plural read signals, and the average of the extracted signals could be used as the output signal level.

In this case, when the amount of light from only ambient light incident to the photodetector 6b is determined to exceed the signal level that is expected when recording paper is inserted, it can be immediately determined that recording paper is not present. This is because when recording paper is present, ambient light is blocked, and there is a limit to the amount of light incident to the photodetector 6b.

Parallel to this measurement operation, the CPU 41 sets the latch circuit 43 and causes the LED drive signal to be output from the output terminal of the latch circuit 43 in order to drive the LED 6a (step S3). Once the latch circuit 43 output is set, that output state is held until it is specifically reset by the CPU 41, and the output state continues even when the CPU 41 enters the sleep mode. The LED 6a continues being driven as long as the latch circuit 43 remains set.

At time t2, the LED 6a goes to the drive state as a result of the LED drive signal being output from the output terminal of the latch circuit 43. However, because the signal level of photodetector 6b output is unstable immediately after the LED 6a is driven and starts outputting light, the CPU 41 cannot take any actual measurements until LED 6a output stabilizes. The time to stabilization depends upon device characteristics.

Because the CPU 41 must wait until the measurement light from the LED 6a stabilizes, the CPU 41 sets the wake-up timer 42 and enters the sleep mode in order to reduce its own power consumption while waiting in the standby mode (step S4). Because the CPU 41 drives only the minimum circuit required to wake up and return to the normal mode while in the sleep mode, power consumption can be greatly reduced while the CPU 41 is waiting.

The time to which the wake-up timer 42 is set is sufficient for the LED 6a to stabilize. More specifically, LED stabilization time=time t3−time t2=T1−T3. Note that because the effect is not changed by setting the LED stabilization time longer than necessary, the LED stabilization time is set to the necessary sufficient time.

As a result, at time t3 when the LED stabilization time has passed, the wake-up timer 42 activates and wakes up the CPU 41 (step S5).

Because the light output of the LED 6a has stabilized to a level enabling measurement at this time, the CPU 41 reads the measurement data, which is the measurement signal M2 output from the photodetector 6b from time t3 to time t4 (step S6). The length of the signal reading period in this case is the same as the background noise measurement time, and in this embodiment of the invention is a signal reading period T3 of 300 ⌈ sec, for example. Similarly to when measuring the background noise, signal M2 is read at least once in this signal reading period, but in order to handle different levels of ambient light, plural measurements could be taken, effective signals could be extracted from the plural read signals, and the average of the extracted signals could be used as the output signal level.

The CPU 41 then calculates the difference between measurement signal M2 and measurement signal M1 (=M2−M1) (step S7), and determines if the difference (the remainder after removing the background noise) is greater than or equal to a specific threshold value (step S8).

If in step S8 the difference exceeds the threshold value (step S8 returns Yes), the CPU 41 determines that the recording paper is at a specific position, and prints on the recording paper using the reverse print mechanism 11 or the front print mechanism 14 (step S9).

If in step S8 the difference is less than the threshold value (step S8 returns No), the CPU 41 determines that the recording paper is not at the specific position, enters a standby state, and issues an error report as necessary (step S10).

FIG. 4 shows a situation in which a state in which the recording paper is determined to not be at the specific position continues for some time. At time t4 the CPU 41 determines that the standby state is continuing, interrupts the drive power supply to the LED 6a, sets the wake-up timer 42, and enters the sleep mode. At time t5, the wake-up timer 42 activates, the CPU 41 wakes up and returns to the same state as at time t1, and the process repeats. As shown at time t6 and time t7, the same process repeats on a cycle equal to times T1+T2.

When the CPU 41 is in the sleep mode and data is received from a device such as a computer that is externally connected to the printer 1, an interrupt could be issued to wake up the CPU 41. When the printer 1 receives data from an externally connected computer while the CPU 41 is in the sleep mode in this case, the CPU 41 wakes up without waiting for an interrupt from the wake-up timer 42, and can execute the process from time t5.

As described above, this embodiment of the invention considers background noise and the stabilization time of the LED 6a used in the leading end paper sensor 6, which is a photosensor, to control a timer (wake-up timer) to maximize the length of the sleep mode in which the CPU 41, which consumes much power while waiting, is asleep, and can therefore significantly reduce power consumption even in a SoC device that is characterized by high power consumption while idle.

The invention is described above using a printer as an example of an information device, but the invention is not so limited and can obviously be used in information devices other than printers to similarly reduce power consumption when intermittent measurements to remove noise are taken using a photosensor that uses an LED, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A detection device comprising:

a light-emitting device that emits a detection beam; a photodetection device that receives the detection beam;

a control unit that outputs a control signal controlling power supply to the light-emitting device; and a holding unit configured to be set and disabled by the control unit and that receives the control signal outputted by the control unit;

wherein the control unit outputs the control signal at a specific interval, supplies and interrupts the supply of power to the light-emitting device, can switch between a normal mode and a sleep mode in which at least some function is disabled, and synchronizes the timing of transitions between the normal mode and the sleep mode with the timing of transitions between supplying and not supplying power to the light-emitting device;

wherein, once the control unit sets the holding unit, the holding unit outputs the control signal to drive the light-emitting device even when the control unit enters the sleep mode;

wherein, once the control unit disables the holding unit, the holding unit holds the control signal; and wherein the control unit outputs the control signal that interrupts the power supply if power was supplied to the light-emitting device, and supplies power if power was not supplied to the light-emitting device, before changing from the normal mode to the sleep mode.

2. The detection device described in claim 1, wherein:

the control unit acquires a detection signal from the photodetection device when power is supplied to the light-emitting device, acquires a detection signal from the photodetection device when power is not supplied to the light-emitting device, and detects the detection beam based on both detection signals.

3. The detection device described in claim 1, wherein:

the interval for changing between the normal mode and the sleep mode is longer than the time required for the detection signal from the photodetection device to stabilize after power supply to the light-emitting device starts.

4. The detection device described in claim 1, further comprising:

a timer that measures at least the sleep time;

wherein the control unit changes from the sleep mode to the normal mode based on time kept by the timer.

5. A printer comprising:

a detection device having a light-emitting device and a photodetection device disposed to a media transportation path that conveys a print medium, a control unit that outputs a control signal controlling power supply to the light-emitting device, and a holding unit that holds the control signal; and a print unit that prints based on detection results from the detection device; wherein the holding unit is configured to be set and disabled by the control unit and receives the control signal outputted by the control unit;

wherein the control unit outputs the control signal at a specific interval, supplies and interrupts the supply of power to the light-emitting device, can switch between a normal mode and a sleep mode in which at least some function is disabled, and synchronizes the timing of transitions between the normal mode and the sleep mode with the timing of transitions between supplying and not supplying power to the light-emitting device;

wherein, once the control unit sets the holding unit, the holding unit outputs the control signal to drive the light-emitting device even when the control unit enters the sleep mode;

wherein, once the control unit disables the holding unit, the holding unit holds the control signal; and wherein the control unit outputs the control signal that interrupts the power supply if power was supplied to the light-emitting device, and supplies power if power was not supplied to the light-emitting device, before changing from the normal mode to the sleep mode.

6. The printer described in claim 5, wherein:

the holding unit holds the control signal at least while the control unit is in the sleep mode.

7. The printer described in claim 5, wherein:

the control unit acquires a detection signal from the photodetection device when power is supplied to the light-emitting device, acquires a detection signal from the photodetection device when power is not supplied to the light-emitting device, and detects the print medium based on both detection signals.

8. The printer described in claim 5, wherein:

the interval for changing between the normal mode and the sleep mode of the control unit is longer than the time required for the detection signal from the photodetection device to stabilize after power supply to the light-emitting device starts.

9. The printer described in claim 5, wherein:

the detection device has a timer that measures at least the sleep time;

wherein the control unit changes from the sleep mode to the normal mode based on time kept by the timer.

10. A control method of a detection device having a light-emitting device that emits a detection beam, a photodetection device that receives the detection beam, a control unit that outputs a control signal controlling power supply to the light-emitting device, and a holding unit configured to be set and disabled by the control unit, the control method comprising steps of:

the control unit switching power supply to the light-emitting device on and off synchronized to the timing at which the control unit changes between a normal mode and a sleep mode in which at least some function is disabled; and the holding unit receiving the control signal outputted by the control unit;

wherein, once the control unit sets the holding unit, the holding unit outputs the control signal to drive the light-emitting device even when the control unit enter the sleep mode; and wherein, once the control unit disables the holding unit, the holding unit holds the control signal;

wherein the control unit outputs the control signal that interrupts the power supply if power was supplied to the light-emitting device, and supplies power if power was not supplied to the light-emitting device, before changing from the normal mode to the sleep mode.

11. The detection device control method described in claim 10, whereby:

the control unit acquires a detection signal from the photodetection device when power is supplied to the light-emitting device, acquires a detection signal from the photodetection device when power is not supplied to the light-emitting device, and detects the detection beam based on both detection signals.

12. The detection device control method described in claim 10, whereby:

the interval for changing between the normal mode and the sleep mode is longer than the time required for the detection signal from the photodetection device to stabilize after power supply to the light-emitting device starts.

13. The detection device control method described in claim 10, wherein:

the detection device has a timer that measures at least the sleep time;

wherein the control unit changes from the sleep mode to the normal mode based on time kept by the timer.

* * * * *